United States Patent Office 2,975,154
Patented Mar. 14, 1961

2,975,154
CYANOPHENYLSILOXANES

Enrico J. Pepe, Kenmore, N.Y., assignor to Union Carbide Corporation, a corporation of New York No Drawing. Filed Nov. 17, 1958, Ser. No. 774,078
6 Claims. (Cl. 260—46.5)

This invention relates to novel organo-functional siloxanes. More particularly, this invention is concerned with novel organo-functional siloxanes containing a cyano group interconnected to silicon through a phenylene group or a bromine substituted phenylene group.

The novel organo-functional siloxanes of this invention are cyanophenylsiloxanes containing at least one unit of the formula:

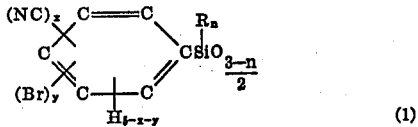

(1)

where R is a monovalent hydrocarbon radical, n is an integer having a value of from 0 through 1, x is an integer having a value of from 1 through 3, y is an integer having a value of from 0 through 4 and the sum of $x+y$ does not exceed 5. The integers represented by n, x and y are each individually the same in the same unit but need not be the same throughout the same molecule. Illustrative of the monovalent hydrocarbon radicals that R represents are alkyl groups, such as methyl, ethyl, propyl and the like, cycloalkyl groups such as cyclohexyl, cyclopentyl and the like, cycloalkenyl such as cyclohexenyl and the like, and aryl groups such as phenyl, alkenyl groups such as vinyl, allyl, butenyl and the like and aryl groups such as phenyl, naphthyl, tolyl and the like.

The novel organo-functional siloxanes of this invention include the cyanophenylsiloxanes consisting of units of Formula 1 and copolymeric siloxanes comprising one or more units represented by Formula 1 intercondensed with one or more siloxane units depicted by the formula:

$$R_a-SiO_{\frac{4-a}{2}}$$

(2)

where R is as above-defined and need not be the same throughout the same molecule, and a is an integer having a value of from 0 through 3: a being the same in the same unit but not necessarily being the same throughout the same molecule.

The cyanophenylsiloxanes of this invention are trifunctional with respect to silicon (i.e. as described by Formula 1, where n=0), and difunctional (i.e. as described by Formula 1, where n=1). The trifunctional cyanophenylsiloxanes are for example

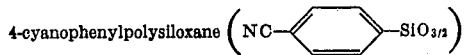

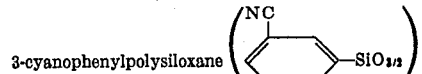

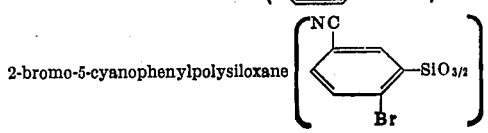

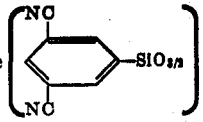

and the like. The difunctional cyanophenylsiloxanes of this invention exist as linear siloxanes or as cyclic siloxanes having from 3 to 7 difunctional units, i.e., units of formula 1 where n=1. Such linear cyanophenylsiloxanes are, for example

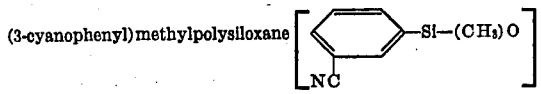

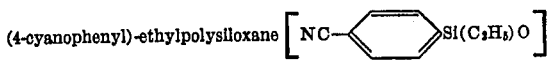

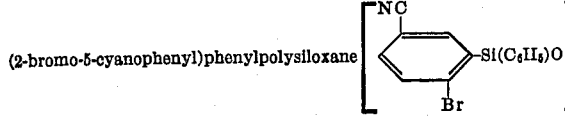

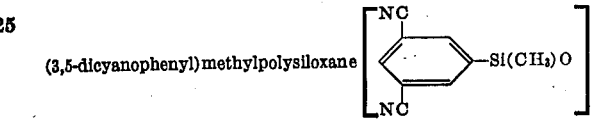

(tricyanophenyl)methylpolysiloxane [(NC)₃—C₆H₂—Si(CH₃)O]

and the like.

Examples of the cyclic cyanophenylsiloxanes are, tetracyanophenyltetramethylcyclotetrasiloxane, tri-(3-cyanophenyl)trimethylcyclotrisiloxane, tetra(dicyanophenyl)-tetramethylcyclotetrasiloxane, tetra(2-bromo-5-cyanophenyl)tetramethylcyclotetrasiloxane and the like. The cyanophenyl siloxanes of this invention also include cyanophenylsiloxanes having combined di- and trifunctional units of Formula 1, i.e. where n is 0 or 1.

The copolymeric cyanophenylsiloxanes of this invention include copolymers composed of trifunctional cyanophenylsiloxane units and mono-, di-, tri- and/or tetrafunctional siloxane units depicted by Formula 2, and also copolymers composed of difunctional cyanophenylsiloxane units and mono-, di-, and/or trifunctional hydrocarbon substituted siloxane units of Formula 2. Also included in the copolymeric cyanophenylsiloxanes of this invention are copolymers consisting of di- and trifunctional units of Formula 1 with mono-, di-, tri- and/or tetrafunctional units of Formula 2.

The cyanophenylsiloxanes of this invention are prepared by the hydrolysis and condensation of cyanophenyltrialkoxysilanes and cyanophenyldialkoxysilanes or the cohydrolysis and cocondensation of these cyanophenylalkoxysilanes with alkoxysilanes in a solvent with water and an acidic or basic catalyst.

A solvent is not needed in the hydrolysis and condensation; however, a solvent is preferred so that the cyanophenylalkoxy silane and the water can come into contact more readily, thus facilitating the hydrolysis of the alkoxy group of the cyanophenylalkoxy silane. Solvents which are useful in the hydrolysis are, for example, benzene, toluene and the like, diethyl ether, diisopropyl ether and the like, dialkyl ethers of ethylene glycol and polyethylene glycol having the formula R'(OCH₂CH₂)ₘOR' where R' is an alkyl group and m is an integer having a value of from 1 through 5.

The catalyst employed in the hydrolysis can be any acid or base. Acid catalysts are, for example, strong acids such as hydrochloric acid, sulfuric acid, trifluoroacetic acid and the like or weaker acids such as acetic acid, oxalic acid and the like. Basic catalysts are, for example, strong bases, such as sodium hydroxide, potassium hydroxide and the like and weak bases such as ammonium hydroxide and the like. The concentration of the catalyst is not narrowly critical and can be from 2 N to 0.001 N. The concentration of the catalyst is preferably kept below 1.0 N in order to prevent, as a side reaction, any possible hydrolysis of the cyano (—CN) group.

The temperature employed in the hydrolysis and condensation is not narrowly critical and can be from 0° C. to 100° C.; however, I prefer to conduct the hydrolysis and condensation at temperatures from about 10° C. to 40° C. to prevent side reactions.

The starting materials for the production of the cyanophenylsiloxanes of this invention are the cyanophenylalkoxysilanes of the formula:

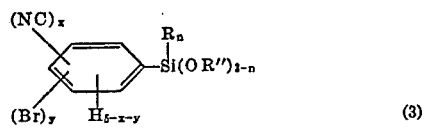

(3)

wherein R, $n$, $x$ and $y$ have the above-defined meanings and R'' is an alkyl group. Such cyanophenylalkoxysilanes are, for example, 3-cyanophenyltriethoxysilane, 2-bromo-5-cyanophenyltrimethoxysilane, 4-cyanophenyltripropoxysilane, 3,5-dicyanophenyltributoxysilane and the like; 3-cyanophenylmethyldiethoxysilane, 3-bromo-5-cyanophenylphenyldipropoxysilane, 2 - bromo - 5 - cyanophenylethyldimethoxysilane, 4 - cyanophenylmethyldiethoxysilane, 3,5-dicyanophenylmethyldiethoxysilane and the like.

The starting materials for the production of the copolymeric cyanophenylsiloxanes are the cyanophenylalkoxysilanes of Formula 3 and alkoxysilanes of the formula:

$$R_a—Si(OR'')_{4-a} \qquad (4)$$

where R, R'' and $a$ have the above-defined meanings.

The cyanophenylalkoxysilanes employed as starting materials in the production of the cyanophenylsiloxanes and copolymeric cyanophenylsiloxanes of this invention are produced by the reaction of a bromophenylalkoxysilane and an alkali metal cyanide according to the procedure given in copending patent application S.N. 774,077 concurrently filed herewith. The cyanophenylalkoxysilanes and processes for preparing them are described in said copending patent application.

The cyanophenylsiloxanes of my invention are extremely resistant to oxidative and thermal degradation. In the form of resins they are useful in coating compositions and can be used either alone or as mixtures with other siloxanes. The difunctional cyanophenylsiloxanes of my invention can be equilibrated to gum stocks and compounded with benzoylperoxide and a silica filler and cured to elastomers having good solvent resistance.

The oxidative stability of the cyanophenylsiloxanes of this invention is demonstrated by a test conducted according to the following procedure:

In separately tared 50 ml. Pyrex beakers were placed approximately 2.0 g. samples of the cyanophenylsiloxane being tested and the total weight of each beaker and contained sample was measured. The beakers were then placed in a 250° C. circulating air oven. At intervals of 25, 50, 75 and 100 hours one of the beakers was removed from the oven and allowed to cool to room temperature. The beaker was weighed and the percent weight loss determined e.g.

Percent-wt. loss

A sample of the cyanophenylsiloxane was then taken for analysis to determine the percent of the carbon, nitrogen and silicon lost by oxidation.

Example I

Diethyl ether (250 ml.) and 3-cyanophenyltriethoxysilane (25 g., 0.94 mol.) were charged into a 1-liter glass reaction vessel. Hydrochloric acid (8.9 ml., 0.1 N) was added and the mixture stirred for 16 hours. The ether was removed by vacuum evaporation and replaced with toluene (250 ml.). The ethanol, formed during hydrolysis, and water were distilled off at atmospheric pressures. The toluene was removed by vacuum evaporation leaving a tacky residue. The tacky residue was solidified by cooling in liquid nitrogen and pulverized to a white, free flowing powder. The white, free flowing powder was further dried at 100° C. under vacuum and then for 1 hour at 250° C. The product was 3-cyanophenylpolysiloxane ($3—NC—C_6H_4—SiO_{3/2}$). Elemental analysis confirmed the identity of the product. 3-cyanophenylpolysiloxane was found to be highly resistant to oxidation when tested for oxidative stability according to the previously described procedure.

Example II

Into a 3-liter distillation flask fitted with magnetic stirring motor and bar were placed

(335 g., 1.42 moles), diethyl ether, 3 liters and 10 ml. of 0.1 normal hydrochloric acid diluted to 200 ml. with water. This mixture was stirred vigorously for 64 hours. Solvent ether was replaced by 200 ml. of toluene and azeotropic distillation for 2 hours removed last traces of water. Toluene was removed by vacuum stripping. Filtering while hot gave 200 g. (96.5 mole-percent yield) of $[3—NC—C_6H_4—Si(CH_3)O]_x$ which was confirmed by elemental analysis. The material when tested for oxidative stability according to the previously described procedure was found to be extremely resistant to oxidation, losing less than 0.4% of its original carbon, 0.6% of its original nitrogen and having a total weight loss of only 0.85% after 172 hours at 250° C.

Example III

Para-cyanophenyltriethoxysilane (36 g.), water (100 ml.), ethanol (20 cc.) were charged into a reaction flask, stirred and allowed to stand over night. No visible hydrolysis was noted. Hydrochloric acid (0.5 ml., 36 N) was added and the mixture stirred. In approximately 1 hour a white solid began to form and the mixture was allowed to stand over night without any further stirring. The solid was filtered and dried for 1 hr. at 250° C. The solid was p-cyanophenylpolysiloxane, ($p-NCC_6H_4SiO_{3/2}$).

The p-cyanophenylpolysiloxane was tested for oxidative stability according to the previously described procedure and was found to be extremely resistant to oxidation at 250° C. and showed a weight loss of only 1.6% after 168 hours at 250° C.

Other cyanophenylsiloxanes of this invention can be prepared by the process as described in Examples I, II, and III, for example:

2-bromo-5-cyanophenylpolysiloxane by the hydrolysis and condensation of 2-bromo-5-cyanophenyltriethoxysilane.

A copolymer containing combined 3-cyanophenylmethylsiloxane units and dimethylsiloxane units by the cohydrolysis and cocondensation of 3-cyanophenylmethyldiethoxysilane and dimethyldibutoxysilane;

2,3-dibromo-5-cyanophenylpolysiloxane by hydrolysis and condensation of 2,3-dibromo-5-cyanophenyltriethoxysilane;

3,5-dicyanophenylmethylpolysiloxane by the hydrolysis and condensation of 3,5-dicyanophenylmethyldimethoxysilane.

What is claimed is:

1. A cyanophenylsiloxane containing at least one unit of the formula:

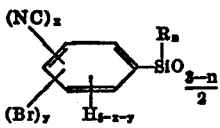

wherein R is a monovalent hydrocarbon radical, $n$ is an integer of from 0 through 1, $x$ is an integer of from 1 through 3, $y$ is an integer of from 0 through 4 and the sum of $x+y$ does not exceed 5.

2. A cyanophenylsiloxane containing at least one unit of the formula:

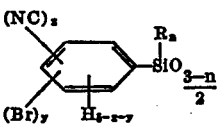

and at least one unit of the formula:

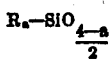

wherein R is a monovalent hydrocarbon radical, $n$ is an integer of from 0 through 1, $a$ is an integer of from 0 through 3, $x$ is an integer of from 1 through 3, $y$ is an integer of from 0 through 4 and the sum of $x+y$ does not exceed 5.

3. A cyanophenylsiloxane consisting of repeating units of the formula:

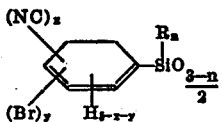

wherein R is a monovalent hydrocarbon radical, $n$ is an integer of from 0 through 1, $x$ is an integer of from 1 through 3, $y$ is an integer of from 0 through 4 and the sum of $x+y$ does not exceed 5.

4. 3-cyanophenylpolysiloxane.
5. 4-cyanophenylpolysiloxane.
6. 3-cyanophenylmethylpolysiloxane.

References Cited in the file of this patent

UNITED STATES PATENTS

| | | |
|---|---|---|
| 2,601,237 | Barry et al. | June 24, 1952 |
| 2,754,284 | Speck | July 10, 1956 |

FOREIGN PATENTS

| | | |
|---|---|---|
| 1,116,726 | France | Feb. 6, 1956 |

OTHER REFERENCES

Lewis et al.: "Journal American Chemical Society," volume 74 (1952), pages 2931–2933.